United States Patent [19]

Rotilio

[11] 4,142,086
[45] Feb. 27, 1979

[54] COMBINATION WELDING TORCH FOR SHIELDED INERT GAS OR ELECTRIC ARC WELDING

[76] Inventor: James V. Rotilio, Carlstadt, N.J.

[21] Appl. No.: 796,433

[22] Filed: May 12, 1977

[51] Int. Cl.² ........................ B23K 9/16; B23K 9/32
[52] U.S. Cl. .................................. 219/75; 219/144; 219/136; 219/137 R; 219/74
[58] Field of Search .............. 219/74, 75, 130, 137 R, 219/136, 144, 140, 121 P, 120, 121 R

[56] References Cited

U.S. PATENT DOCUMENTS

| | | | |
|---|---|---|---|
| 2,468,805 | 5/1949 | Herbst | 219/75 |
| 2,468,808 | 5/1949 | Drake | 219/75 |
| 2,842,656 | 7/1958 | Neuvirth | 219/75 |
| 3,097,290 | 7/1963 | Guida | 219/75 |
| 3,238,350 | 3/1966 | Klasson et al. | 219/75 |
| 3,397,298 | 8/1968 | Nelson | 219/75 |
| 3,739,140 | 6/1973 | Rotilio | 219/75 X |
| 3,878,354 | 4/1975 | Frantzreb, Sr. | 219/74 |
| 4,049,943 | 9/1977 | Pratt | 219/74 |

Primary Examiner—Arthur T. Grimley
Assistant Examiner—M. Paschall
Attorney, Agent, or Firm—Martha G. Pugh

[57] ABSTRACT

Welding torch comprises a combination collet body which functions interchangeably for electric arc welding, of the open arc type using a consumable electrode, or for inert gas shielded welding using a non-consumable electrode. The collet body has a screw-threaded collar at one end which is screwed into the welding head. At the other end, it has a slitted or splined chuck. The slightly enlarged central body portion between the collar and the chuck includes a plurality of gas vents. For open arc welding, a consumable electrode, interposed into the chuck, is secured in place by a constricting metal adapter sleeve which also serves to close the gas vents. For inert gas shielded welding, the consumable electrode and the metal adapter are replaced by a nonconsumable electrode and a ceramic shield open at one end. The open vents permit inert gas to escape under the ceramic shield and surround the nonconsumable electrode during the welding process.

9 Claims, 9 Drawing Figures

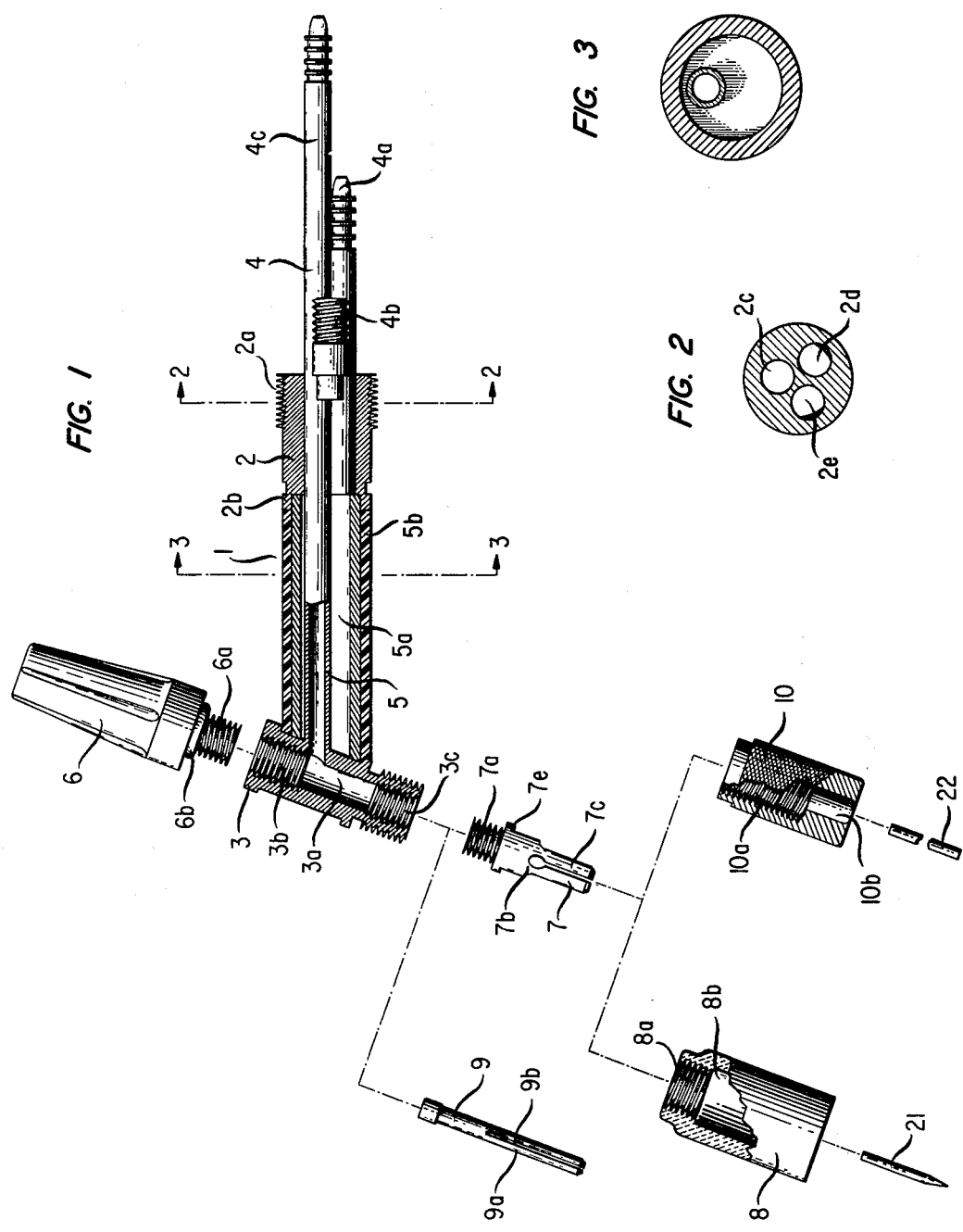

COMBINATION WELDING TORCH FOR SHIELDED INERT GAS OR ELECTRIC ARC WELDING

BACKGROUND OF THE INVENTION

This invention relates in general to welding torches and, more particularly, to welding torches for electric arc welding which can be adapted to function interchangeably for electric open arc welding, or for inert gas shielded arc welding.

In the carrying out of electric arc welding operations, it is often necessary or desirable to switch from open arc welding, which employs a consumable electrode, to electric arc welding of a different type employing inert gas shielding and a nonconsumable electrode. For interchangeably performing these two different types of electric arc welding, my U.S. Pat. No. 3,739,140, issued June 12, 1973, discloses and claims a combination welding torch which includes a torch body member connectable to gas, electrical and cooling water supplies, the body member having a head portion encased in an insulating cover, and including a hollow collar having internal screw threading.

If the welder wishes to perform electroc open arc welding, using a consumable electrode, he screws the upper end of a downwardly extending hollow chuck member into the internal collar of the welding head. He then fits a consumable electrode into the downwardly extending splined portion of a chuck member and fits on and screws in place a hollow cylindrical adapter over the upper end of the chuck member with the upper end of the adapter juxtaposed against the lower end of the welding head collar.

If the welder wishes to perform an inert gas shielded arc weld, the consumable electrode arc welding chuck and adapter must be unscrewed. These are replaced in the welding head collar by a three-piece assembly which includes a hollow electrode retainer having a splined chuck member into which is fitted a nonconsumable electrode, and over which is superposed a hollow collar member including a plurality of peripheral gas vents, a hollow ceramic shield being fitted over the assembly.

SUMMARY OF THE INVENTION

In order to substantially reduce the number of operations in shifting from electric open arc welding using a consumable electrode, to electric arc welding of the shielded gas type using a nonconsumable electrode, I have invented a combination collet body and chuck which is externally screw-threaded at its upper end to screw into the internally screw-threaded collar at the lower end of the welding head of the torch body member. The combination collet body of the present invention is generally cylindrical in shape, having a slightly enlarged mid-section, and tapered to a slightly smaller cross-section at the slitted or splined lower end comprising the chuck. The middle and upper sections enclose a cylindrical chamber of substantially uniform cross-section, having a plurality of peripheral openings or vents at the lower constricted end of the chamber for the escape of gas during the inert gas shielded arc welding process.

To practice inert gas shielded arc welding, once the combination collet body is in place, the nonconsumable electrode is passed through the chuck of the combination collet body and is secured into an electrode retainer which is accommodated in the cavity of the welding head. A cylindrical ceramic shield in the form of a sleeve is superimposed over the collet body so that its upper end screws onto the external screw threads at the lower end of the welding head collar of the torch body member, and its lower end is open and spaced apart from the chuck and the gas vents to permit the flow of shielding inert gas to surround the nonconsumable electrode during this operation.

If it is desired to switch to electric open arc welding, it is only necessary to remove the ceramic shield, remove the nonconsumable electrode, place a consumable electrode in the chuck of the combination collet body, and screw the upper end of a cylindrical metal adapter onto the screw-threaded lower end of the welding head collar of the arc welding torch. The cylindrical adapter functions to bear against and constrict the chuck of the combination collet body, so that the consumable electrode is firmly held in place. It also functions to close the gas vents during the more conventional welding operation.

In the first case, when welding with a nonconsumable electrode, the gas intake pipe is connected up to a source of inert gas, such as argon, which is passed into the welding torch under pressure and passes out through the perforations in the collet body. Cooling water passes into and out of the welding head, which is connected through an electrical lead to a transformer or other conventional source of high current.

During the open arc welding, the inert gas intake is disconnected.

The chief advantage of the combination collet body of the present invention is that the welding operator can quickly shift from open arc welding using a consumable electrode, to inert gas welding using a nonconsumable electrode, with almost no loss of time, greatly reducing welding labor costs. The safety factor is also increased, as there is less danger to the welding operator with fewer elements to screw and unscrew during the changeover operation.

These and other objects, features and advantages will be apparent to those skilled in the art from a detailed study of the specification with reference to the attached drawings.

BRIEF DESCRIPTION OF THE DRAWINGS

FIG. 1 is an overall showing, partly in section, of a combination welding head, together with a combination collet body and attachments for alternative use for electric open arc welding or for inert gas welding;

FIGS. 2 and 3 are sections taken along the planes indicated by the arrows 2—2 and 3—3 of FIG. 1;

DETAILED DESCRIPTION

Figure 4:
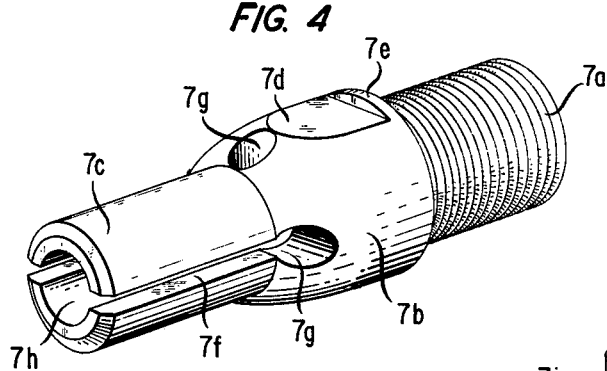
FIG. 4 is an enlarged perspective showing of the combination collet body of FIG. 1.

Referring to FIG. 1 of the drawings, there is shown, partly in section and with the parts disassembled in exploded view, a combination welding torch 1 in accordance with the present invention, which is constructed to be used, in the alternative, either for electric open arc welding, employing a consumable electrode, or for inert gas shielded electric arc welding, employing a nonconsumable electrode. In the embodiment under description, the elements of welding torch 1 are formed of a metal having a high conductivity for electricity and heat, and a high melting point, such as, for example, beryllium, or various alloys of chromium and copper, and other metals such as an alloy known in the art by the trademark "DURONZE," manufactured by the Bridgeport Brass Company of Bridgeport, Connecticut.

In the present embodiment, the solid cylindrical body member 2 may be, for example, 15/16 inch (2.4 cm.) along the axis and ¾ inch (1.9 cm.) in maximum diameter, having an externally screw-threaded portion 2a at its outer end and an annular collar 2b extending in an axial direction at its inner end. The body member 2 is solid, except for three tubular openings 2c, 2d and 2e, each about 3/32 inch (5 mm.) in cross-section, which may be substantially symmetrically disposed about the axis of 2, each extending through the length of member 2, parallel to the axis. See FIG. 2, which shows a section through member 2 along the plane indicated by the arrows 2—2 in FIG. 1.

The collar 2b is welded or otherwise secured to an annular shoulder at one end of a tubular member 5 of the welding torch, having a cylindrical inner chamber 5a. Tubular member 5 is ⅜ inch (1.0 cm.) in inner diameter, ½ inch (1.35 cm.) in outer diameter and extends about 1¾ inches (4.5 cm.) along the axis where it connects to the head portion 3.

The three openings 2a, 2b and 2c are designed to accommodate the metal connecting tubes 4a, 4b and 4c, which fit into the respective openings as shown in section in FIG. 2.

Cooling water passes into the internal chamber 5a through a conduit from a source not shown, which is connected to tube 4b. The latter is about 11/16 inch (1.8 cm.) long, extending a short distance into the right-hand end of the tubular opening 2e. In addition to functioning as a cooling water inlet, tube 4b serves as a conduit for an electrical lead to a transformer or other high direct current source of electrical power of a type conventionally used for welding. Tube 4b makes electrical contact by means of an annular shoulder which rests on the flat metal surface at the external face of body member 2. Thus, high amperage electrical current from the conventional transformer, or other source, is conducted through the tubular member 5 to the welding head and through welding electrode to form the arc, the return to ground being through the work. The welding operation is usually carried out using current within the range, for example, of 100 to 500 amperes, depending on the weld to be performed and the materials used. The voltages are kept low, within the range 10–20 volts, for safety.

The tube 4a, which in the present embodiment is about 2¼ inches (5.5 cm.) long, extends through opening 2d, the axial length of body member 2, and projects about 1 7/16 inches (3.6 cm.) beyond the right-hand end, being screw-threaded at its external end for fastening to a hose (not shown) serving as a cooling water exhaust from the inner chamber 5a of tubular member 5.

The gas intake tube 4c, which is about 5¼ inches (13.2 cm.) long, passes through the tube 2c and continues parallel with the axis of tube 5, being secured at its left-hand end in gastight relation transversely to the inner chamber 3a of welding head 3, the two axes forming an angle of about 113.5°. The screwthreaded end of tube 4c, which projects about 2½ inches (6.5 cm.) from the external face of body member 2 when the torch is assembled, is connected through a hose (not shown) to a source of inert gas, such as argon, which is stored in a conventional cylinder and fed into the pipe at the rate of, say, 10 liters of gas per hour. For electrical and heat insulation during operation, the tubular member 5 is surrounded by a sleeve 5b of insulating material, such as hard rubber, neoprene or the like.

The hollow cylindrical welding head 3, when the torch is assembled, is securely fitted into an indentation in the left-hand end of tube 5, so that the axes of the two tubes form an internal angle of, say, 113.5°. The upper portion of welding head 3 is ½ inch (1.3 cm.) in outer diameter and 5/16 inch (8 mm.) in inner diameter in the central chamber, which measures about 13/16 inch (2.0 cm.) along the axis. Between the two ends, the diameter of the upper portion of welding head 3 is slightly recessed to accommodate an insulating sleeve (not shown). The upper end 3b is internally screw-threaded for a distance of, say, ¼ inch (6 mm.) along the axis. The connecting collar 3c at the lower end, which is stepped back relative to the upper portion, to an outer diameter of ¼ inch (6 mm.), is both internally and externally screw-threaded for an axial distance of ¼ inch (6 mm.).

The insulating handle 6 is of hard rubber, or some other suitable insulating material, and is somewhat frustroconical in shape so that it can be easily grasped, extending 1 3/8 inches (3.5 cm.) along the axis. A screw-threaded portion 6a, which is just under 5/16 inch (8 mm.) in outer diameter and reduces to an internal diameter of about ⅛ inch (0.3 cm.), projects an axial distance of about ¼ inch (6 mm.) from the lower end and is designed to mate with and screw into the internal screw-threaded portion 3b of the cylindrical head 3, against the internal rubber gasket 6b.

Specifically, for use during the inert gas shielded welding, a slitted or splined electrode retainer, shown at 9 in FIG. 1, is interposed into the cavity 3a of the welding head 3, with its axis disposed parallel to the axis of the cavity. Electrode retainer 9 is 1⅛ inches (3 cm.) long. The body portion has an outer diameter of ⅛ inch (3.5 mm.) and an inner diameter of 3/32 inch (2.5 mm.). The lower end 9a has a pair of diametrical slits 9b, 30 mils wide, extending ¾ inch (1.9 cm.) above the open lower end. The electrode retainer 9 functions to hold in place the nonconsumable electrode 21, which is tightly secured when the projection 6a of the handle 6 is screwed into place in the screw-threaded portion 3b of the welding head 3.

Figure 5:
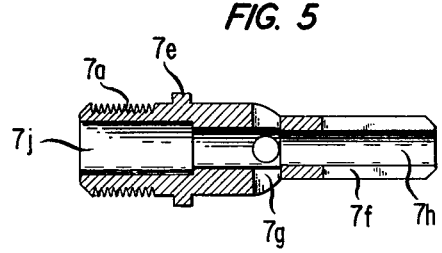
FIG. 5 is a longitudinal section along a diametrical plane of FIG. 4.
Figure 6:
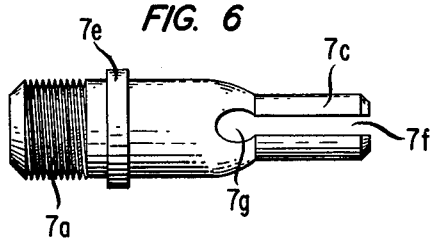
FIG. 6 is a side elevational showing of the collet body of FIG. 4.
Figure 7:
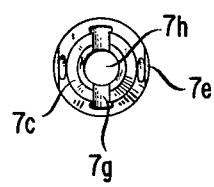
FIG. 7 is an end elevation looking in through the chuck of FIG. 4.

A particular feature of the present invention is the combination collet body 7, which is shown in enlarged detail in FIG. 4, in longitudinal section in FIG. 5, in longitudinal elevation in FIG. 6, and in lower end elevation in FIG. 7.

In the present illustrative embodiment, the combination collet body 7 is 15/16 inch (2.4 cm.) in overall length, having an upper connecting end 7a, a body portion 7b and a slitted or splined chuck member 7c. The upper part of body portion 7b is 5/16 inch (8 mm.) in outet diameter at shoulder 7e adjacent screw-threaded end 7a. The latter, which is externally screwthreaded, extends about ¼ inch (6 mm.) in an axial direction above shoulder 7e and has an outer diameter of just under ¼ inch (6 mm.), so that it is accommodated in the internal screw-threaded portion 3c of head 3. Body portion 7b, which is a rounded frustroconical shape, extends about ¼ inch (6 mm.) along the axis and is constricted at its lower end to an outer diameter of ¼ inch (6 mm.) at the plane where the bifurcated or slitted cylindrical chuck member 7c is concentrically formed in integral relation with the body portion. Chuck member 7c extends about ⅜ inch (9 mm.) in an axial direction. Its two longitudinal slits 7f are each about 30 mils wide, extending along the length of the chuck, the slits separating it into two halves along a diametric plane. It will be understood, of course, that the chuck 7c is not limited to two longitudinal slits, but could have a plurality of slits, so that the chuck could comprise a plurality of longitudinal splines. The inner diameter of central opening 7h of chuck 7 is ⅛ inch (3 mm.), which enables it to accommodate either the consumable electrode used for open arc welding or to pass through the nonconsumable electrode used for inert gas shielded welding. A plurality of gas vent openings 7g (which number four in the present embodiment), each about 1/16 inch (1.5 mm.) in diameter, are symmetrically disposed around the lower end of body portion 7b adjacent the upper end of chuck member 7c. Two of the openings are connected to the ends of diametrical slits 7f. The body portion 7b is flattened at two opposite sides with planes 7d, about 3/16 inch (4 mm.) wide at the top, to provide gripping positions for a wrench in tightening and loosening the collet body 7 when it is interposed in the torch head 3.

The cylindrical inner chamber 7j, formed in body portion 7b, above chuck member 7c, has an inner diameter of ⅛ inch (3 mm.) and extends about ¼ inch (6 mm.) along the axis to an internal shoulder where it widens out to a diameter of 3/16 inch (5 mm.), extending to the end of externally screw-threaded portion 7a.

In adapting the welding torch for electric open arc welding, the operator disconnects the tube 4c or closes a valve from the inert gas source. A hose connection to a source of cooling water is made to tube 4b. The contacting plug of tube 4b is also connected by means of a lead wire to a transformer or other source of high current (which may range from 100 to 500 amperes) for energizing the welding torch. Tube 4a is connected up to a vent for return of the cooling water. The power remains turned off until the welding head is ready for operation.

Referring to FIG. 1, the operator interposes in slitted chuck 7h of combination collet body 7 the upper end of a consumable electrode 22, comprising, for example, a rod of steel, such as stainless steel, chromiun, or an alloy of chromium and steel, which may range, for example, from 40 mils (1 mm.) to ¼ inch (6 mm.) in cross-section and may be any desired length, depending on the weld to be made. The combination collet body 7 has been screwed into the welding torch head 3 at 3c. The cylindrical shield 10, which may be, for example, beryllium, or an alloy containing copper and chromium, such as DURONZE, is 1 inch (2.5 cm.) in overall length and ½ inch (1.3 cm.) in outer diameter. The upper end of shield 10 is internally screw-threaded for an axial length of, say ⅝ inch (1.6 cm.), having an internal diameter of, say, ⅜ inch (1 cm.). The lower end of shield 10 is constricted to an axial bore 10b, which is ⅜ inch (1 cm.) long and 3/16 inch (5 mm.) in inner diameter, being just smaller than the diameter of chuck member 7c, unless the latter is squeezed together inside of shield 10 so as to close the slits 7f. The external surface of shield 10 is preferably scored or roughened so that it can more readily be tightened in place with a wrench.

Figure 8:
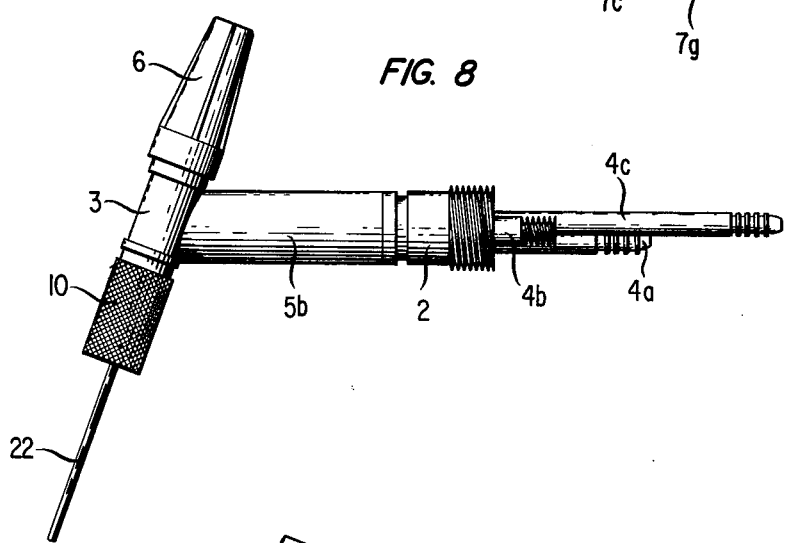
FIG. 8 shows the welding head of FIG. 1, including the combination collet body of the present invention, assembled for electric open arc welding.
Figure 9:
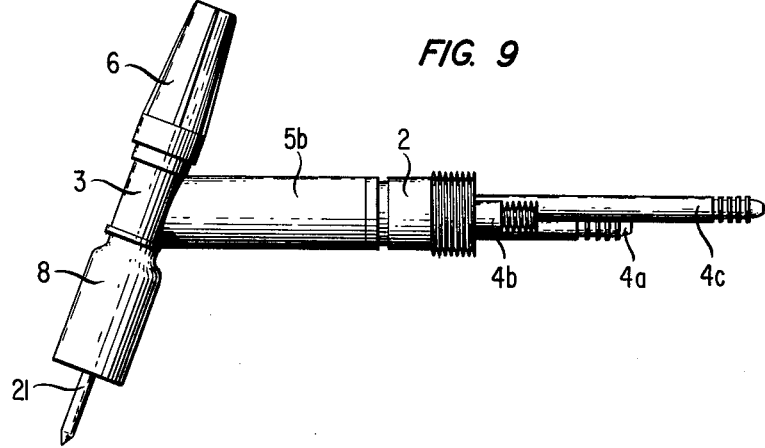
FIG. 9 shows the welding head of FIG. 1, including the combination collet body, assembled for inert gas shielded arc welding.

Shield 10 is fitted over collet body 7 so that the upper end of the shield screws onto the external screw threads at the lower end 3c of the welding torch head 3. Thus, the bore 10b in shield 10 contacts and constricts the chuck member 7c, forcing it to tightly grip the upper end of consumable electrode 22. At the same time, the bore 10b serves to close the gas vents 7g, which are not used during the conventional welding operation, during which the insulating handle 6 is screwed into the upper end 3b of the welding head 3. The power is then turned on and the welding head, connected as shown in FIG. 8, is ready for open arc welding.

In order to change to inert gas shielded arc welding, the operator, after temporarily turning off the power, simply removes the shield 10 and the consumable electrode 22.

He then inserts the relatively short nonconsumable electrode rod 21, which may, for example, be a tungsten rod having a thickness, say, within the range 20 mils to 5/32 inch (0.5 mm to 3 mm.) and several inches long, depending on the weld to be performed. Rod 21 is passed through the chuck 7h and is gripped in the slitted end 9b of the electrode retainer 9, which is disposed longitudinally in the cavity 3a of the welding head 3. When the connecting collar 6a of handle 6 is tightened in place in the screwthreaded portion 3b of the head 3, this serves to secure the nonconsumable electrode 21 in place. The electrode retainer 9 remains in the cavity 3a, it not being necessary to remove it for open arc welding. After the tungsten or other nonconsumable electrode rod 21 is in place, the operator screws torch welding head 3 into the cylindrical ceramic shield 8, which is 13/16 inches (3 cm.) in axial length and ⅝ inch (1.6 cm.) in overall outer diameter. The upper end 8a of shield 8, which is stepped back to an outer diameter of ½ inch (1.25 cm.), is internally screw-threaded an axial length of about ¼ inch (6 mm.) down from the top, having an inner diameter of ⅜ inch (8 mm.), which is designed to be accommodated in the lower connecting collar 3c of welding torch head 3. Ceramic shield 8 has a cylindrical cavity 8b open at the lower end, which is 1 inch (2.5 cm.) along the axis and 7/16 inch (1.15 cm.) in inner diameter, so that the inner walls of shield 8 are spaced apart from the chuck 7c and the electrode rod 21 passing through its opening. Also, space is provided around the gas vents 7g so that inert gas flows out of them, passing under and out of the welding shield 8 during the inert gas welding operation.

The tube 4c is connected to a cylinder, or other supply source, of inert gas, such as argon, which is conventionally fed into the welding torch at the rate of, say, 10 liters of gas per hour. The gas passes in through the tube 4c into cavity 3a of head 3 and is vented through the openings 7g in combination collet body 7, as previously described. The power is turned on when the operator is ready to perform inert gas shielded arc welding.

It will be understood that the scope of the present invention is not limited to the specific forms or dimensions disclosed herein by way of example, but only as defined in the appended claims.

What is claimed is:

1. A welding torch assembly kit having component parts capable of being assembled for either electric open arc welding using a consumable electrode rod, or inert gas shielded electric arc welding, using a nonconsumable electrode rod, which comprises in combination:
a single welding head and body combination including means connectable to a source of high current power, to fluid cooling means, and to an inert gas source;
said welding head including electrode retaining means;
a combination hollow collet body connectable to said welding head, said collet body terminating at its external end in a slitted or splined chuck, and having an internal chamber including gas venting means disposed adjacent said chuck and constructed to communicate with said welding head;
shielding means in the form of a first and a second sleeve alternatively connectable to said welding head, each of said sleeves having a longitudinal internal chamber at least partially open at the external end, and constructed and arranged to depend from said welding head to surround said collet body including said chuck in substantially coaxial relation,
said first sleeve, which is constructed for open arc welding using a consumable electrode, consisting essentially of metal, wherein said longitudinal internal chamber is constricted at one end to bear against and constrict the opening of said chuck and to close said gas venting means when said first sleeve is connected in place on said welding head; and
said second sleeve, which is constructed for inert gas shielded arc welding using a nonconsumable electrode, consisting essentially of heat resistant electrical insulating material, wherein said longitudinal internal chamber is constructed and arranged to surround said chuck and said gas venting means is annular spaced-apart relation.

2. The combination in accordance with claim 1 wherein said first and second sleeves are adapted to be removably screwed onto said welding head, and wherein said first sleeve consisting essentially of metal is constructed and arranged to variably constrict the opening of said chuck as said first sleeve is screwed in place on said welding head.

3. The combination in accordance with claim 1 wherein said second sleeve consists essentially of a hollow cylinder of ceramic material.

4. A welding torch assembly kit having component parts capable of being assembled for either electric open arc welding using a consumable electrode, or inert gas shielded electric arc welding using a nonconsumable electrode, which torch assembly comprises in combination:
a hollow cylindrical metal welding head having two ends, from at least one of which extends a connecting collar internally and externally screw-threaded;
a tubular metal body disposed to be secured at one of its ends in transverse relation to said welding head at a position intermediate between the ends of said welding head;
said tubular body including intake and exhaust means for cooling water;
electrical contact means connectable in energy transfer relation with said tubular body for connecting said welding torch to a source of high current electrical power;
said tubular body including a conduit connectable at its external end to a source of inert gas and capable of communicating at its internal end in gas transfer relation with the interior of said welding head;
electrode retaining means for a nonconsumable electrode disposed in the interior of said welding head;
a hollow partially cylindrical collet body including externally screw-threaded connecting means at one end constructed and arranged to screw into the internally screw-threaded connecting collar of said welding head so that the interior of said collet body is disposed in gas transfer relation with the interior of said welding head;
said collet body including at its other end a slitted or splined chuck extending axially from said collet body, said chuck constructed and arranged to accommodate through its central opening electrode rods of substantially different thicknesses;
the central portion of said collet body adjacent the upper end of said chuck having a plurality of openings symmetrically spaced around the inner end of said chuck for venting gas from said interior hollow portion,
a hollow cylindrical heat resistant insulating sleeve and a hollow cylindrical metallic sleeve, each internally screw-threaded at one end, said insulating sleeve and said metallic sleeve constructed for alternative accommodation on the external screw threads of the connecting collar of said welding head, for inert gas arc welding or open arc welding respectively,
wherein for inert gas shielded arc welding the external end of said insulating sleeve when screwed in place on the connecting collar of said collet body forms an annular sleeve surrounding and spaced apart from said slitted or splined chuck member and the venting gas openings of said collet body, permitting the nonconsumable electrode to pass through said collet body and be secured in said electrode retaining means; and
wherein for electric open arc welding the external end of said hollow cylindrical metallic sleeve as it is screwed in place on the connecting collar of said collet body is constructed and arranged to close said gas venting openings and to engage and variably constrict said slittled or splined chuck member of said collet body causing it to secure in place the consumable electrode.

5. The combination in accordance with claim 4 wherein said insulating sleeve is primarily of ceramic.

6. A combination collet body for adapting an assembly including a single welding torch for either open arc welding or inert gas shielded arc welding, which collet comprises in combination:
a tubular body including a screw-threaded collar substantially coaxial with said tubular body and extending in an axial direction from one end of said body, said screw-threaded collar being adapted for connection in coaxial mating relation with one end of said welding torch, said tubular body having an elongated slitted or splined chuck having a longitudinal central opening extended coaxially at the other end of said body, said tubular body having an enlarged rounded central portion disposed between said screw-threaded collar and said chuck which portion includes a plurality of substantially symmetrically spaced gas escape vents communicating with the interior of said body and disposed around the periphery of said portion just above the inner end of said slitted or splined chuck;

a metal sleeve constructed to be superimposed on said collet body in coaxial relation thereto for electric open arc welding;

said sleeve having an internal diameter at one end which exceeds the maximum cross-section of said collet body, the cross-section dimension at the other end of said sleeve tapering to an internal diameter which is slightly less than the normal cross-sectional diameter of said slitted or splined chuck, whereby said sleeve is constructed when in place on said collet body to constrict the central opening of said chuck and also to close said gas escape vents.

7. In combination with the collet body of claim 6 a ceramic sleeve constructed to be superposed in coaxial relation to said collet body for inert gas shielded arc welding, said sleeve having a substantially uniform internal diameter in the portion adjacent said collet body which exceeds the maximum cross-sectional dimension of said collet body, whereby the inner surface of said sleeve is spaced apart from said gas escape vents and from said chuck, thereby to permit the flow of shielding gas during the inert gas welding operation.

8. The method of operating a welding torch assembly including a single welding head for either electric open arc welding a consumable electrode or inert gas shielded electric arc welding using a nonconsumable electrode which comprises the steps of:

interposing into said welding head adapter means including an internal chamber having gas venting means and a slitted or splined chuck;

continuously maintaining said adapter means in place in said welding head for both said open arc welding and said inert gas shielded welding operations, (a) for electric open arc welding:
 interposing a consumable electrode into said adapter means,
 interposing means coaxially over said adapter means to close said gas venting means and to constrict said chuck in gripping relation to said consumable electrode; and alternatively (b) for inert gas shielded arc welding:
 interposing a nonconsumable electrode through said chuck and securing the same in said welding head including said adapter means, and
 interposing coaxially over said chuck a heat resistant cylindrical shield the internal surface of which is spaced apart from said gas venting means and from said nonconsumable electrode, thereby to provide for the flow of gas through said gas venting means to surround said electrode during said inert gas arc welding operation.

9. The method in accordance with claim 8 wherein said adapter means includes an internal chamber having gas venting means and a slitted or splined chuck disposed in internal relation.

* * * * *